US008644600B2

(12) United States Patent
Yang et al.

(10) Patent No.: US 8,644,600 B2
(45) Date of Patent: Feb. 4, 2014

(54) LEARNING OBJECT CUTOUT FROM A SINGLE EXAMPLE

(75) Inventors: Qiong Yang, Beijing (CN); Fang Wen, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/810,595

(22) Filed: Jun. 5, 2007

(65) Prior Publication Data
US 2008/0304735 A1    Dec. 11, 2008

(51) Int. Cl.
*G06K 9/00* (2006.01)

(52) U.S. Cl.
USPC ........... 382/162; 382/164; 382/173; 382/199; 345/629; 345/592; 701/29; 701/213; 701/207; 701/83

(58) Field of Classification Search
USPC ........ 382/164, 180, 162; 701/207, 83, 86, 87, 701/29, 213; 345/629, 592
See application file for complete search history.

(56) References Cited

U.S. PATENT DOCUMENTS

| | | | |
|---|---|---|---|
| 5,442,716 | A | 8/1995 | Otsu et al. |
| 6,021,221 | A | 2/2000 | Takaha |
| 6,178,264 | B1 | 1/2001 | Kamatani |
| 6,240,423 | B1 | 5/2001 | Hirata |
| 6,400,996 | B1 * | 6/2002 | Hoffberg et al. ................. 700/83 |
| 6,973,212 | B2 | 12/2005 | Boykov et al. |
| 6,977,664 | B1 | 12/2005 | Jinzenji et al. |
| 7,054,489 | B2 | 5/2006 | Yamaoka et al. |
| 7,085,401 | B2 * | 8/2006 | Averbuch et al. ............. 382/103 |
| 7,298,895 | B2 * | 11/2007 | Loui et al. ..................... 382/171 |
| 7,532,752 | B2 * | 5/2009 | Wen et al. ..................... 382/162 |
| 7,593,020 | B2 * | 9/2009 | Zitnick, III ................... 345/592 |
| 7,630,541 | B2 * | 12/2009 | Zitnick, III ................... 382/162 |
| 7,706,610 | B2 * | 4/2010 | Zhang et al. .................. 382/173 |

(Continued)

FOREIGN PATENT DOCUMENTS

| | | |
|---|---|---|
| EP | 1624413 | 2/2006 |
| JP | 2006251149 A | 9/1994 |

(Continued)

OTHER PUBLICATIONS

Li. et al., "Lazy Snapping", available at least as early as Feb. 27, 2007, at www.wisdom.weizmann.ac.il/~boiman/reading/image%20mattinglLazySnap.pdf>>, ACM, 2004, pp. 303-308.*

(Continued)

*Primary Examiner* — Mekonen Bekele
(74) *Attorney, Agent, or Firm* — Lee & Hayes, PLLC

(57) ABSTRACT

Systems and methods are described for learning visual object cutout from a single example. In one implementation, an exemplary system determines the color context near each block in a model image to create an appearance model. The system also learns color sequences that occur across visual edges in the model image to create an edge profile model. The exemplary system then infers segmentation boundaries in unknown images based on the appearance model and edge profile model. In one implementation, the exemplary system minimizes the energy in a graph-cut model where the appearance model is used for data energy and the edge profile is used to modulate edges. The system is not limited to images with nearly identical foregrounds or backgrounds. Some variations in scale, rotation, and viewpoint are allowed.

20 Claims, 14 Drawing Sheets
(5 of 14 Drawing Sheet(s) Filed in Color)

(56) References Cited

U.S. PATENT DOCUMENTS

| | | | |
|---|---|---|---|
| 2003/0012454 | A1 | 1/2003 | Manico et al. |
| 2003/0046150 | A1* | 3/2003 | Ader et al. .................. 705/14 |
| 2006/0291721 | A1* | 12/2006 | Torr et al. .................. 382/173 |
| 2007/0014473 | A1 | 1/2007 | Slabaugh et al. |
| 2007/0122039 | A1* | 5/2007 | Zhang et al. ................ 382/199 |
| 2007/0165949 | A1* | 7/2007 | Sinop et al. ................ 382/173 |
| 2007/0165966 | A1* | 7/2007 | Weiss et al. ................ 382/284 |
| 2008/0198175 | A1* | 8/2008 | Sun et al. .................. 345/629 |

FOREIGN PATENT DOCUMENTS

| | | | |
|---|---|---|---|
| JP | 2007121710 A | | 5/1995 |
| JP | 11250106 A | * | 9/1999 |
| JP | 20000242782 A | | 9/2000 |
| JP | 2002242782 A | * | 8/2002 |
| JP | 2004120092 A | | 4/2004 |
| WO | WO2006092542 A1 | | 9/2006 |

OTHER PUBLICATIONS

Jue et al., "Interactive Video Cutout", published on 2005 ACM, p. 585-594.*

Chao et al., "Progressive Cut", ACM, pp. 10, published on Oct. 2006.*

Jue et al.,"Interactive Video Cut", published in 2005, ACM, pp. 585-559.*

Interactive Graph Cuts for Optimal Boundary & Region Segmentation of Objects in N-D Images, Proceedings of"Internation Conference on Computer Vision", Vancouver, Canada, Jul. 2001, vol. I pp. 105-112.*

Carsten et al., "GrabCut—Interactive Foreground Extraction using Iterated Graph Cuts", published in 2004 ACM,p. 309-314.*

Jue et al.,"Interactive Video Cut", published in 2005, ACM, pp. 585-594.*

Boykov, et al., "Interactive Graph Cuts for Optimal Boundary & Region Segmentation of Objects in N-D Images", available at least as early as Feb. 27, 2007, at <<http://www.cad.zju.edu.cn/home/ywguo/Paper/Interactive%20Graph%20Cuts%20for%20Optimal%20Boundary%20&%20Region%20Segmentation%20of%20Objects%20in%20N-D%20Images.pdf>>, vol. 1, pp. 105-112.

Li, et al., "Lazy Snapping", available at least as early as Feb. 27, 2007, at <<http://www.wisdom.weizmann.ac.il/~boiman/reading/image%20matting/LazySnap.pdf>>, ACM, 2004, pp. 303-308.

Rother, et al., "GrabCut"—Interactive Foreground Extraction using Iterated Graph Cuts, available at least as early as Feb. 27, 2007, at <<http://www.wisdom.weizmann.ac.il/~boiman/reading/image%20matting/GrabCut.pdf>>, ACM, 2004, pp. 309-314.

Wang, et al., "Interactive Video Cutout", available at least as early as Feb. 27, 2007, at <<http://students.washington.edu/juew/VideoCutout2005.pdf>>, pp. 1-10.

PCT Search Report for Application No. PCT/US2008/065889, mailed Oct. 24, 2008, 11 pages.

The Extended European Search Report mailed Dec. 1, 2011 for European patent application No. 08770171.0, 7 pages.

Sun, et al., "Background Cut", Lecture Notes in Computer Science, vol. 3952, May 7, 2006, pp. 628-641.

The Chinese Office Action mailed Sep. 13, 2012 for Chinese patent application No. 200880018756.1, a counterpart foreign application of U.S. Appl. No. 11/810,595, 6 pages.

The Chinese Office Action mailed Dec. 31, 2011 for Chinese patent application No. 200880018756.1, a counterpart foreign application of U.S. Appl. No. 11/810,595, 7 pages.

The Chinese Office Action mailed Feb. 28, 2013 for Chinese patent application No. 200880018756.1, a counterpart foreign application of U.S. Appl. No. 11/810,595, 10 pages.

* cited by examiner

LEARNING OBJECT CUTOUT FROM A SINGLE EXAMPLE

BACKGROUND

Object cutout is an important and fundamental issue in computer vision. The typical mechanism for performing the cutout or isolation of a visual object in an image is binary segmentation, in which every pixel in the image is assigned either a first value if it belongs to a foreground object or a second value if it belongs to the background. Depending on the particular process in operation, this binary labeling either originates from a segmentation boundary between visual foreground and background, or proceeds from a pre-existing segmentation boundary that is known beforehand. There are numerous conventional techniques for determining an optimal segmentation boundary for cutting out foreground objects.

In content-based image retrieval (CBIR), a query image is often used as an example to retrieve images with similar content. However, in most cases, conventional retrieval techniques can only compute low-level features from the entire query image to represent the content of that image. High-level semantic information in the query image is mostly lost. Thus, the performance of conventional retrieval systems is often poor. One way to more closely represent the semantic content of a query image is to try to cutout the foreground object(s) in both the query image and the database images. However, such object cutout is still a challenging problem.

Existing bottom-up approaches for segmenting a general collection of images can hardly achieve semantic segmentation, since they mainly aggregate pixels into segments according to low-level features such as uniformity of color, texture, or smoothness of bounding contours. User interaction can greatly improve segmentation results, but to segment vast numbers of images through user interaction is prohibitively expensive in large databases, such as the CBIR image database. What is needed is an accurate and robust way to automatically apply segmentation results from a query image or a few query images to infer segmentation results that can be propagated to segment a large collection of images. Then, through progressive propagation, a small number of user operations would be able to achieve segmentation of numerous images.

Conventional methods that try to propagate segmentation results from one to many images have severe limitations. For example, some require numerous training images for each type of image category, which is usually not possible. Others require both the foreground and background of sample images and test images to be highly similar. When there is a slight change in the illumination of a face, or a change in shape or shadow, these conventional methods fail. Few natural images can satisfy the stringent similarity requirement of these conventional techniques. Other conventional methods are simply too slow, even when a slow process is expected, requiring intensive processing that is too complex to be practical for such applications as image retrieval or video cutout. Still other conventional methods require that two images have strikingly different backgrounds in order to propagate segmentation across images.

SUMMARY

Systems and methods are described for learning visual object cutout from a single example. In one implementation, an exemplary system determines the color context near each block in a model image to create an appearance model. The system also learns color sequences that occur across visual edges in the model image to create an edge profile model. The exemplary system then infers segmentation boundaries in unknown images based on the appearance model and edge profile model. In one implementation, the exemplary system minimizes the energy in a graph-cut model where the appearance model is used for data energy and the edge profile is used to modulate edges. The system is not limited to images with nearly identical foregrounds or backgrounds. Some variations in scale, rotation, and viewpoint are allowed.

This summary is provided to introduce the subject matter of learning object cutout from a single example, which is further described below in the Detailed Description. This summary is not intended to identify essential features of the claimed subject matter, nor is it intended for use in determining the scope of the claimed subject matter.

BRIEF DESCRIPTION OF THE DRAWINGS

This patent application contains at least one drawing executed in color. Specifically.

FIG. 8 is a diagram available in color introducing exemplary extraction of edge profiles.

FIG. 9 is a diagram available in color of exemplary differentiation between foreground objects and background objects.

FIG. 10 is a diagram available in color of an exemplary technique of extracting a Local Color Pattern and an edge profile.

FIG. 11 is a diagram available in color showing the effect and importance of local color pattern and edge profile modulation.

FIG. 12 is a diagram available in color comparing exemplary object cutout techniques with conventional object cutout techniques.

DETAILED DESCRIPTION

Overview

Figure 1:
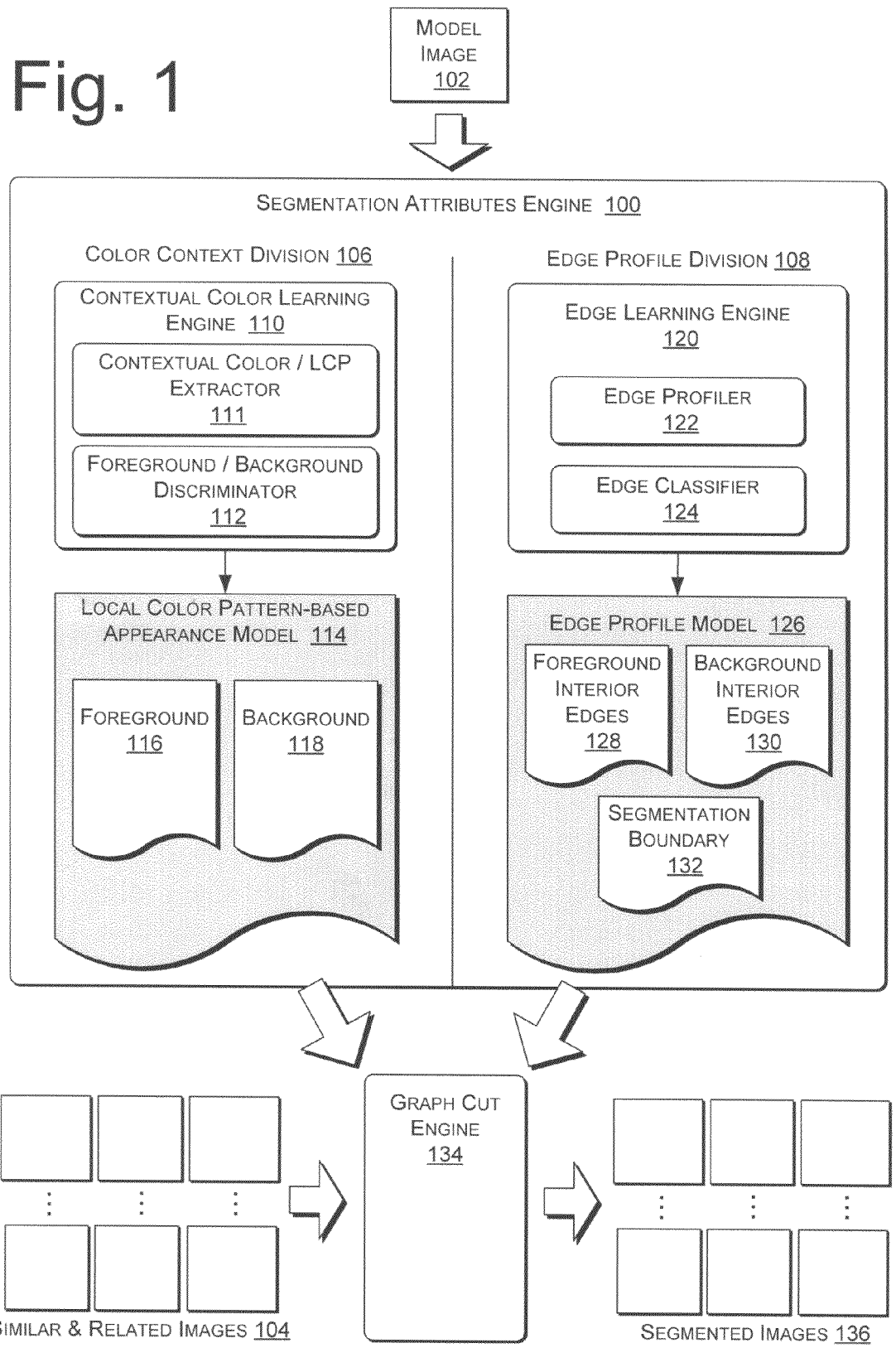
FIG. 1 is a diagram of an exemplary segmentation attributes engine.

This disclosure describes systems and methods for learning visual object cutout from a single or a few examples. Exemplary techniques can be used, for example, to cut out objects in a group of relatively similar images based on a single example. An exemplary system utilizes "segmentation attributes" exemplified in a color pattern model and an edge profile model to learn object cutout of similar images starting from a single example.

The exemplary system extracts a Local Color Pattern (LCP) which characterizes spatial configuration of colors. This feature is obtained by searching for distinguished colors/color modes along certain directions, thus it is invariant to the scale of color patches. The LCP model is also much more discriminative compared with single color or histogram features, since contextual color information is taken into consideration.

The exemplary system also extracts edge profile features in the normal direction of an edge, and uses these to discriminate edges along foreground/background boundary ("boundary edge") from "interior" edges inside the foreground or the background ("interior edges"). This edge feature is invariant to the rotation of objects. By enhancing possible boundary edges and attenuating possible interior edges, object cutout is more likely to follow the true object boundary.

In one implementation, the exemplary system integrates the LCP model and the edge profile model in a graph-cut framework, and thereby obtains higher accuracy and robustness in cutout results due to the complementary contributions of these two model.

General Description

In one implementation, the exemplary visual object cutout systems and methods described herein track "segmentation attributes" that assist in propagating accurate segmentation from one or more model images to other related or sometimes unrelated images. Segmentation is a process of labeling each pixel in the image as foreground object(s) and background. Visual object cutout implies the process of isolating or cutting out the foreground object(s) from the background.

In one example system, the segmentation attributes can be contextual colors, for example, Local Color Patterns (LCPs), and edge appearance profiles used for edge modulation. In one implementation, Local Color Pattern information and edge modulation provide complementary information for the task of visual object cutout.

The term "contextual colors" is used loosely herein to refer to colors that are near a particular part of the image (e.g., a block) in different directions or to color patterns around or involving the part of the image—such as a block. "Contextual colors" and "Local Color Pattern" are used somewhat interchangeably herein. More specifically, from one standpoint, exemplary processes may gather contextual colors in different directions from each block to establish an appearance model and/or may determine variations in surrounding color modes around each block to establish Local Color Patterns, which then form the basis of the appearance model. In one implementation, determining a color mode includes finding out how many primary colors constitute the foreground object and the background, what the primary colors are; and determining the probability that one color occurs concurrently with another color.

Referring to FIG. 1, in one implementation, an exemplary system uses an appearance model 114 that is based on both the Local Color Pattern (LCP) model introduced above and an edge profile model 126. The exemplary system integrates this appearance model 114 and the edge profile model 126 in a graph-cut framework. The LCP model improves the discriminative ability of the appearance model 114 to describe foreground/background regions by extracting scale invariant color pattern to characterize color context. The edge model 126 effectively modulates the contrast of the image by enhancing the edge along an object boundary and attenuating edges inside objects, thus leading to more reasonable cutout results. Compared with conventional state-of-the-art algorithms, the exemplary system demonstrates higher accuracy and improved robustness.

The contextual color and/or Local Color Pattern model greatly reduces uncertainty when the foreground object and the background have similar color appearances. For each block of an image, an exemplary system records nearby contextual colors that fall into a different color mode. This identifies a given block not only according to its own color but also according to these nearby contextual colors. Such exemplary contextual color extraction is a powerful tool for recognizing and distinguishing foreground from background, which are difficult to discriminate when discriminating only by the general color of each. For example, if the segmentation boundary occurs around the face of a person with long black hair in the image, then this contextual attribute—that the face is always framed by black hair—can be of great assistance in segmenting another face with long black hair. Likewise, the exemplary appearance profile of the edge that outlines such a face is another segmentation attribute that can be learned from a model image and propagated for segmenting similar images—even if the face is at a different angle or different size.

The edge modulation feature complements the above-introduced contextual color pattern extraction, thereby further increasing the accuracy of segmentation. In one example system, the system learns the various edges of one or more model images. The system extracts edge profiles: for example, color strips or "elements" taken at right angles through an edge at various points along the edge. Each color strip or element includes the sequence of colors (or grayscale, intensity, etc.) on either side of, and including, the edge. To propagate the segmentation of the model image to other images, the edge modulation feature uses these color elements or edge profiles to attenuate strong interior edges that lead to unwanted segmentation in the interior of foreground or background segments. At the same time, the edge modulation feature strengthens the segmentation boundary between foreground and background.

Although the edge modulation feature usually augments the contextual color pattern feature, in fact, the two features assist each other depending on circumstances. In rare cases when the extracted contextual colors for a foreground object are similar to the extracted contextual colors of the background (the probability of this happening is much lower than the foreground and background merely having the same general color), then the edge modulation feature provides augmentation by discriminating the interior edges (inside a foreground object or inside the background) from the segmentation boundary between foreground and background. Conversely, when the interior edges and the segmentation boundary share similar edge profiles (e.g., appearance), then the contextual color pattern feature augments in discriminating between the two types of edges. That is, the contextual color pattern feature is defined not on the edge itself, but on an "element" of the image. Thus, the contextual color pattern feature augments the segmentation due to the following difference: for an interior edge, elements on both sides of the edge most likely belong to the object part according to the contextual color pattern feature. But for the segmentation boundary, only elements on one side of the edge most likely belong to the object. In this manner, both contextual color and edge profile information are effectively integrated to provide a powerful, more accurate, and more desirable segmentation result.

Exemplary System

Referring again to FIG. 1, an exemplary segmentation attributes engine 100 receives a model image 102 (or multiple model images) in order to obtain segmentation attributes for assisting with segmentation of similar or related images 104. "Related" images 104 share a degree of background and/or foreground similarity with the model image 102. The illustrated engine 100 has a color context division 106 for gathering contextual color attributes of a segmentation instance in the model image 102, and an edge profile division 108 for gathering edge profile attributes of the segmentation instance in the model image 102. An exemplary contextual color learning engine 110 includes a contextual color extractor 111 and a foreground/background discriminator 112 to yield an appearance model 114 that includes a model of the foreground 116 and a model of the background 118. As compared with conventional techniques, the appearance model 114 defines a contextual color-based appearance model for the data energy used in certain segmentation calculations, which helps to determine foreground and background in related images. The term "likelihood energy" is used somewhat interchangeably with "data energy" herein.

In a related image 104, the extracted contextual colors almost always resolve themselves into either the operative foreground palette or background palette represented in the model image's appearance model 114.

Accordingly, the exemplary segmentation attributes engine 100 includes an edge learning engine 120 that has an edge profiler 122 and an edge classifier 124. The edge learning engine 120 yields an edge profile model 126, with detected edges classified as foreground interior edges 128, background interior edges 130, or the segmentation boundary 132. This edge profile model 126 is used to modulate the smoothness energy term in a min-cut/max-flow binary labeling optimization (to be described below with respect to Equation (1)). That is, the edge classification model 126 can be used to effectively attenuate interior strong edges and moderately strengthen the segmentation (foreground/background) boundary in the related images 104, leading to accurate and robust results.

Additional Exemplary Systems

Figure 2:
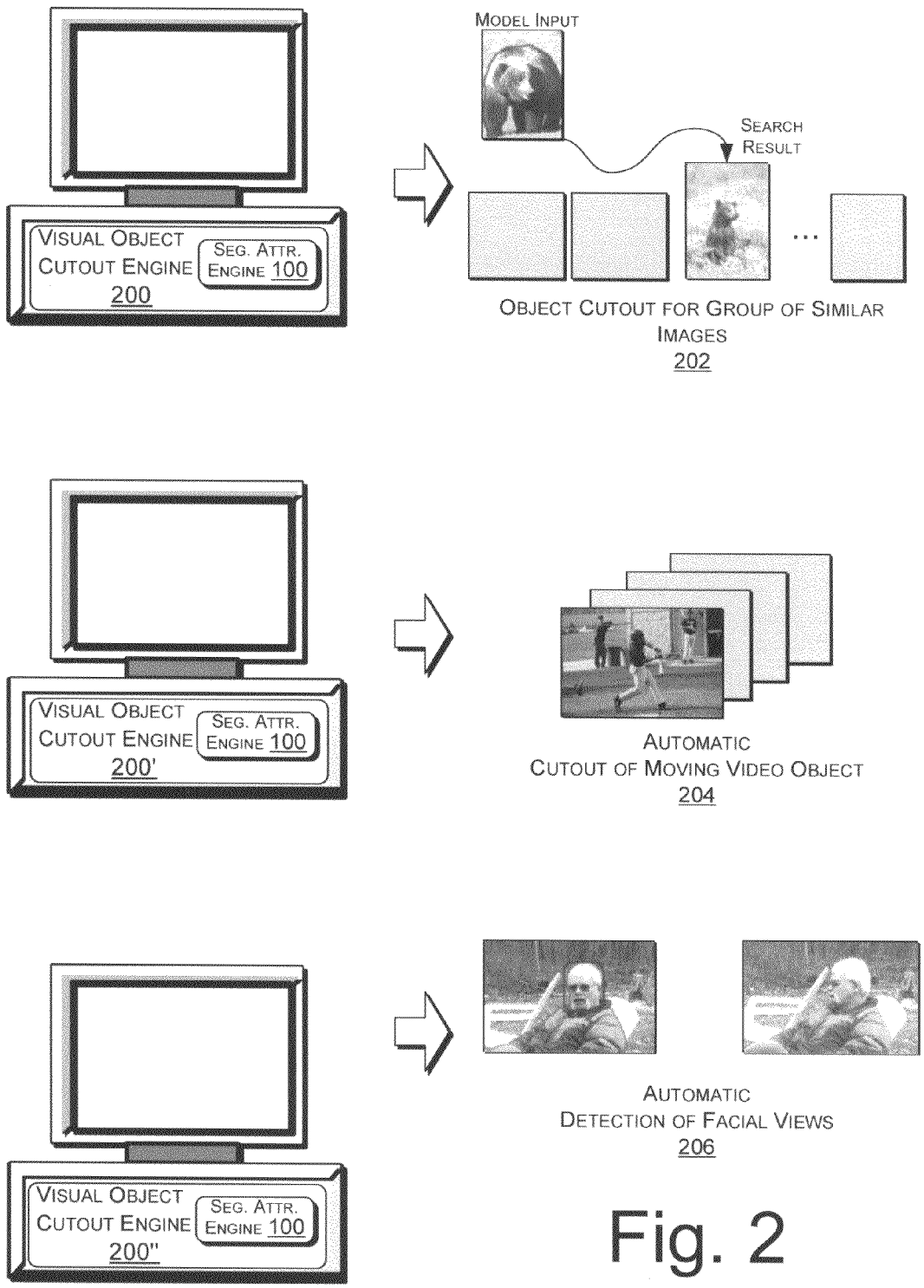
FIG. 2 is a diagram of various systems that include an exemplary visual object cutout engine.

FIG. 2 shows multiple variations of the exemplary visual object cutout engine 200, each including the segmentation attributes engine 100 of FIG. 1. In one variation 202, the exemplary visual object cutout engine 200 performs object cutout for groups of similar images. For example, it is common to take a batch of similar photos in sequence. Such photos in a group share similar foreground and background. So, when an object is cut out in one photo, the visual object cutout engine 200 can help to cut out similar objects in all photos in the group automatically 202, which greatly reduces manual labeling work. Thus, to cut out an object from a group of similar images, the first image is used as an example with a predefined object cutout, which is then used to segment all the other similar images.

In a second variation 204, the exemplary visual object cutout engine 200' performs automatic cutout of a moving object from a video—i.e., in a sequence of video frames. In one implementation, this video object cutout is performed across the sequence of frames by relying on the contextual color and edge profile attributes of segmentation in a selected model frame, instead of by relying on temporal information or motion estimation to predict where the moving object has moved across frames. Thus, in this second variation 204, the user is not required to manually cut the video into shots so that frames in each shot are consecutive, and the video frames do not have to be processed in any temporal or sequential order.

As a result, the visual object cutout engine 200' can handle situations when there is sharp, short change, as long as the color model remains somewhat fixed.

In a third variation 206, the exemplary visual object cutout engine 200" performs automatic detection of facial views, such as a side-view. Side views of faces are quite challenging for existing face detection techniques that use only facial features. But the segmentation attributes gathered and tracked by the visual object cutout engine 200", such as contextual colors and edge profiles, can be utilized to detect the face even when the angle of rotation of the head has changed, or the size, viewpoint or even age of the face have changed.

Exemplary Engine

Figure 3:
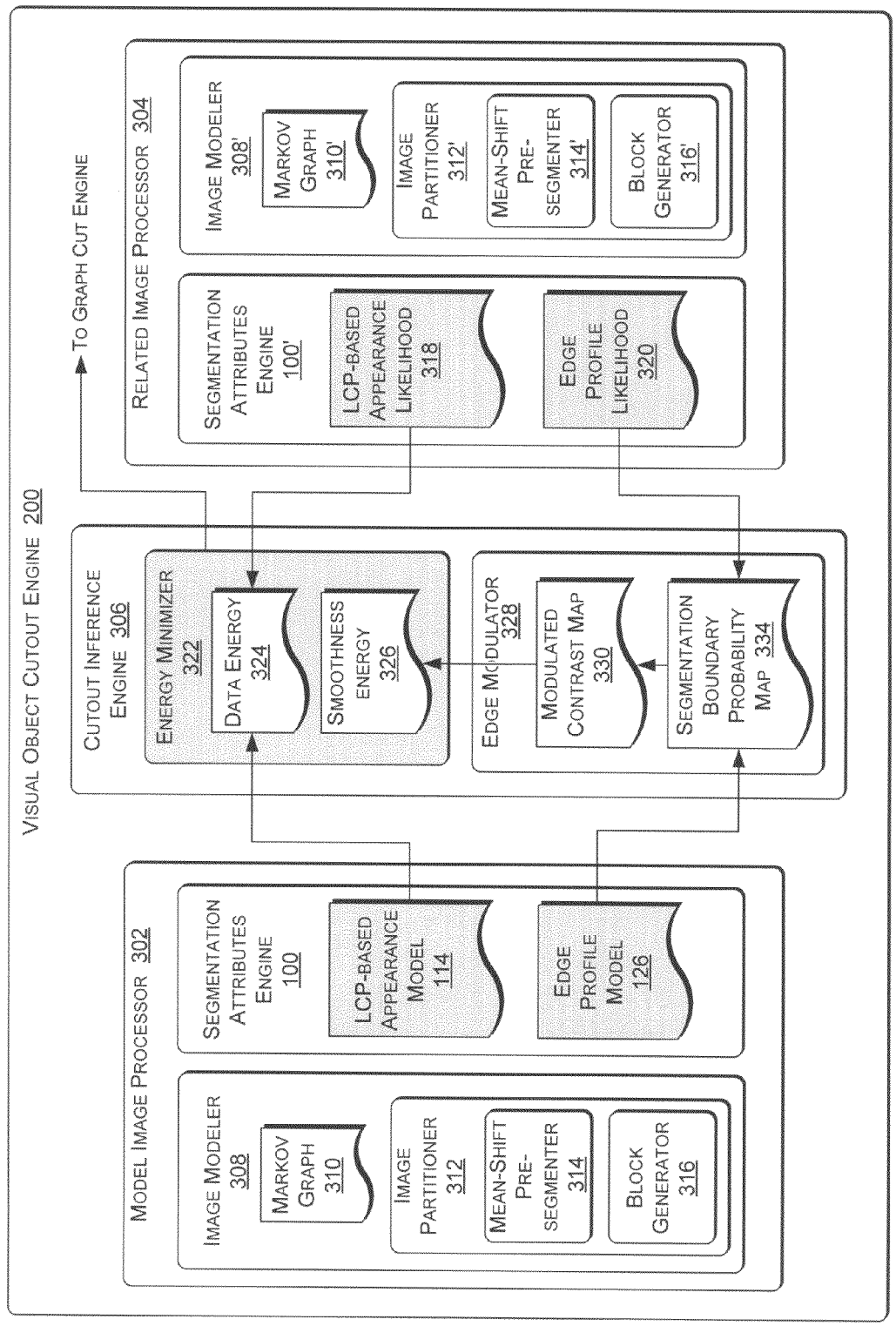
FIG. 3 is a block diagram of the exemplary visual object cutout engine of FIG. 2 in greater detail.

FIG. 3 shows the exemplary visual object cutout engine 200 of FIG. 2, in greater detail. The illustrated implementation is one example configuration, for descriptive purposes. Many other arrangements of the components of an exemplary visual object cutout engine 200 are possible within the scope of the subject matter. Such an exemplary visual object cutout engine 200 can be executed in hardware, software, or combinations of hardware, software, firmware, etc.

The exemplary visual object cutout engine 200 includes a model image processor 302 to gather and track the segmentation attributes of the model image 102, a related image processor 304 to gather and track corresponding attributes of related images 104 to be segmented, and a cutout inference engine 306 to optimize the segmentation of the related images 104 based on the segmentation attributes of the model image 102. The components of each of these main components will be listed below, followed by a description of exemplary operation of the visual object cutout engine 200. It should be noted that in some implementations, many of the components listed and described below for processing the model image 102 and then processing the related images 104 may be the same component or a common component. In FIG. 3, however, the components that process the model image 102 and the related images 104 are shown as separate entities, wherever possible, for clarity of description.

The model image processor 302 extracts segmentation attributes, such as contextual colors and edge profiles, into the appearance model 114 and the edge profile model 126. The model image processor 302 includes an image modeler 308 and includes the segmentation attributes engine 100 of FIG. 1. The image modeler 308, in turn, includes a Markov graph 310 representation of the model image 102, and an image partitioner 312 that includes a Mean-shift pre-segmenter 314 and a block generator 316. These will be described in greater detail further below.

The visual object cutout engine 200 also includes a related images processor 304 for performing corresponding image modeling of the related images 104 to be segmented. Thus, the related image processor 304 includes a version of the image modeler 308' for partitioning the related image(s) 104, including a corresponding Markov graph 310' representation of each related image 104 to be processed; and an image partitioner 312' that includes a Mean-shift pre-segmenter 314' and block generator 316'.

Figure 4:
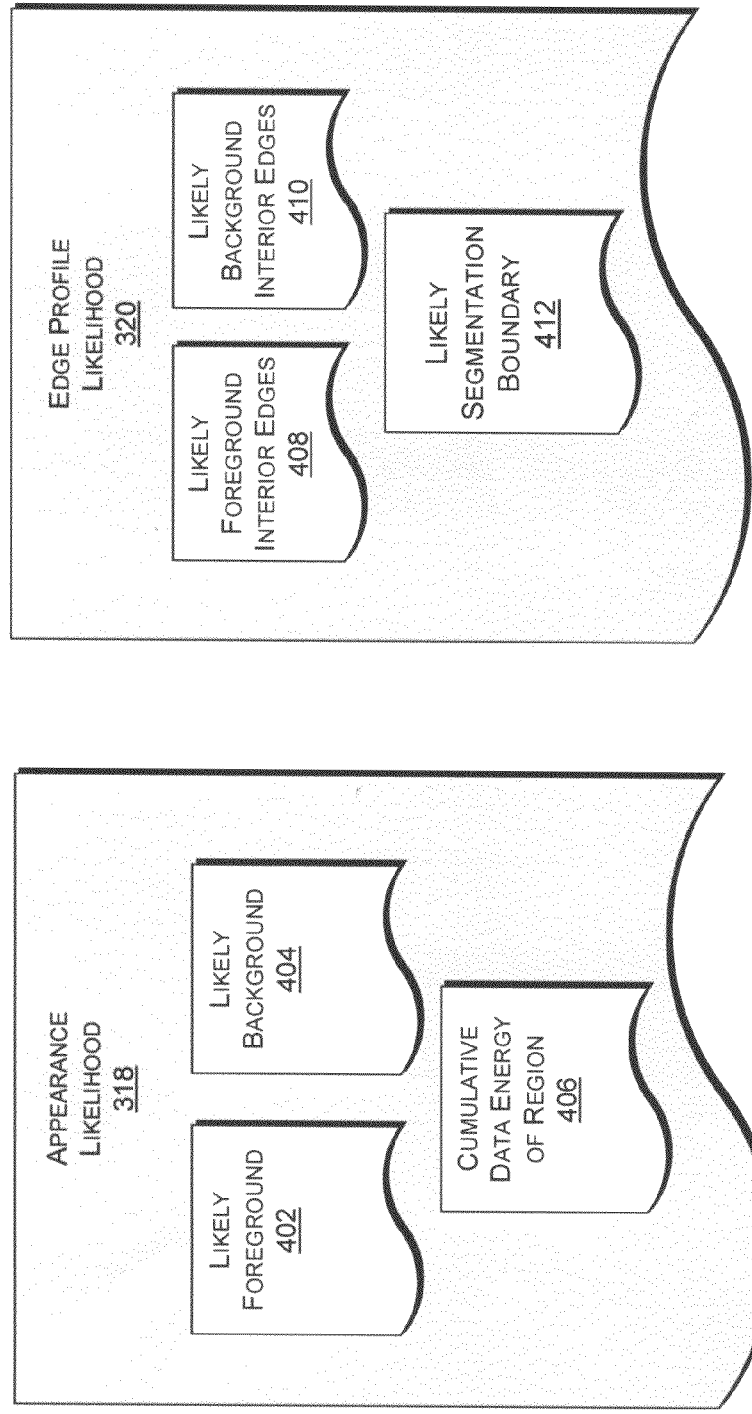
FIG. 4 is a diagram of the exemplary appearance likelihood model and edge profile likelihood model of FIG. 3, in greater detail.

In one implementation, the segmentation attributes engine 100' for processing the related images 104 has similar or equivalent components as the segmentation attributes engine 100 for processing the model image 102, except that "appearance likelihood 318" of a related image 104 is used instead of the analogous "appearance model 114" associated with the model image 102. Likewise, "edge profile likelihood 320" associated with a related image 104 is used instead of the analogous "edge profile model 126" of the model image 102. This is because the cutout inference engine 306 optimizes the segmentation boundary of a related image 104 by improving the appearance likelihood 318 and edge profile likelihood 320 of the related image 104, as assisted by the appearance model 114 and the edge profile model 126 of the model image 102. Thus, as shown in FIG. 4, the appearance likelihood 318 encompasses likely foreground 402, likely background 404, and cumulative data energy of a region 406, derived from the likely foreground 402 (to be described more fully below, i.e., with respect to operation of the engine). The edge profile likelihood 320 encompasses likely foreground interior edges 408, likely background interior edges 410, and a likely segmentation boundary 412.

The cutout inference engine 306 includes an energy minimizer 322 that performs the above-introduced optimization. In one implementation, the energy minimizer 322 executes a min-cut/max-flow technique that performs the optimization by minimizing an energy consisting of data energy 324 related to the contextual color attributes associated with the appearance model 114 and appearance likelihood 318; and a smoothness energy 326 related to the edge profile attributes associated with the edge profile model 126 and the edge profile likelihood 320.

In one implementation, an edge modulator 328 influences the energy minimizer 322 by attenuating foreground interior edges 128 and background interior edges 130 and moderately strengthening segmentation boundary edges 132. In other words, the edge modulator 328 makes the proposed segmentation boundary in a related image 104 more apparent in light of the edge profile model 126 of the model image 102. In one implementation, the edge modulator 328 includes a segmentation boundary probability map 334 based on the edge profile model 126 of the model image 102, which in turn creates a modulated contrast map 330 that modifies the smoothness energy 326. The smoothness energy 326 enters into the optimizing calculation(s) of the energy minimizer 322.

Figure 5:
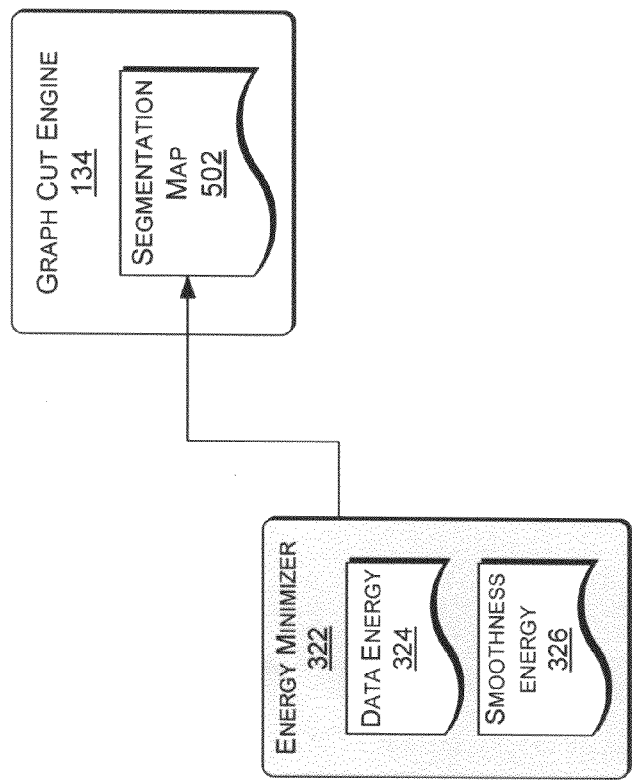
FIG. 5 is a diagram of an exemplary energy minimizer in relation to a graph cut engine.

In one implementation, as shown in FIG. 5, the energy minimizer 322 may proceed pixel by pixel through an image to optimize a segmentation map 502 in the graph cut engine 134. The graph cut engine 134 then executes segmentation, e.g., of a foreground object from a background, guided by the optimized segmentation map 502.

Referring back to FIG. 2, the segmentation may be used in propagating segmentation from one model image 102 to a group of related images 104, such as similar photos of a family vacation. In other implementations, such as those shown in variations 204 and 206 of FIG. 2, (e.g., variations 200', and 200" of the visual object cutout engine 200), the output of the energy minimizer 322 may be fed to an engine that performs automatic cutout of a moving video object (204), or to an engine that performs automatic detection of a face in different viewpoint (206).

Operation of Exemplary Systems and Engines

The exemplary visual object cutout engine 200 can provide robust and efficient propagation of segmentation results from a single or few model images 102 to other similar images.

In one implementation, the exemplary visual object cutout engine 200 allows some scale change, view change, and local structure change in the object or background. In order to achieve this, the contextual color learning engine 110 derives the contextual colors and/or Local Color Pattern of image regions. There is generally strong color context in the interior of an object to be cutout and in the background, and this strong context is very useful for discriminating object/foreground from background, especially when the object possesses a similar color as the background. For example, in an image of a person standing before a wall, the region of the facial complexion may be almost exactly the same color as the wall. This makes it hard to discriminate the two only on the basis of their overall, general color. However, there is often strong context around such a face, for example, the hair. Making use of this contextual attribute can greatly assist in discriminating the correct visual objects to cut out.

The contextual colors and/or Local Color Patterns provide a much stronger mechanism for differentiating foreground from background than conventional techniques that differentiate foreground from background only on the basis of the general color of each. Instead of just relying on each block's own color properties to surmise whether the block is foreground or background, each block can provide its information with respect to nearby colors. Further, since foreground and background almost always consist of disparate color palettes—even when the overall color of foreground and background appear similar—the associated nearby contextual colors associated with each block almost always fit one of the profiles of either the foreground palette or the background palette, thus identifying the block as either foreground or background.

The edge learning engine 120 learns the appearance along an edge within the model image 102, and thereby determines whether an edge in a related image 104 is an interior edge or the foreground/background boundary (also being referred to herein as the segmentation boundary). With this learned edge information, the visual object cutout engine 200 can drive the segmentation of related images 104 to more accurately find and follow their "true" segmentation boundaries. For example, a white piece of clothing in the foreground may have similar color and color context as a patch of sunlight in the background of the same image. However, the learned edge appearance can easily help determine the probability of whether an edge of a white region in a related image 104 likely belongs to the white clothing.

Figure 6:
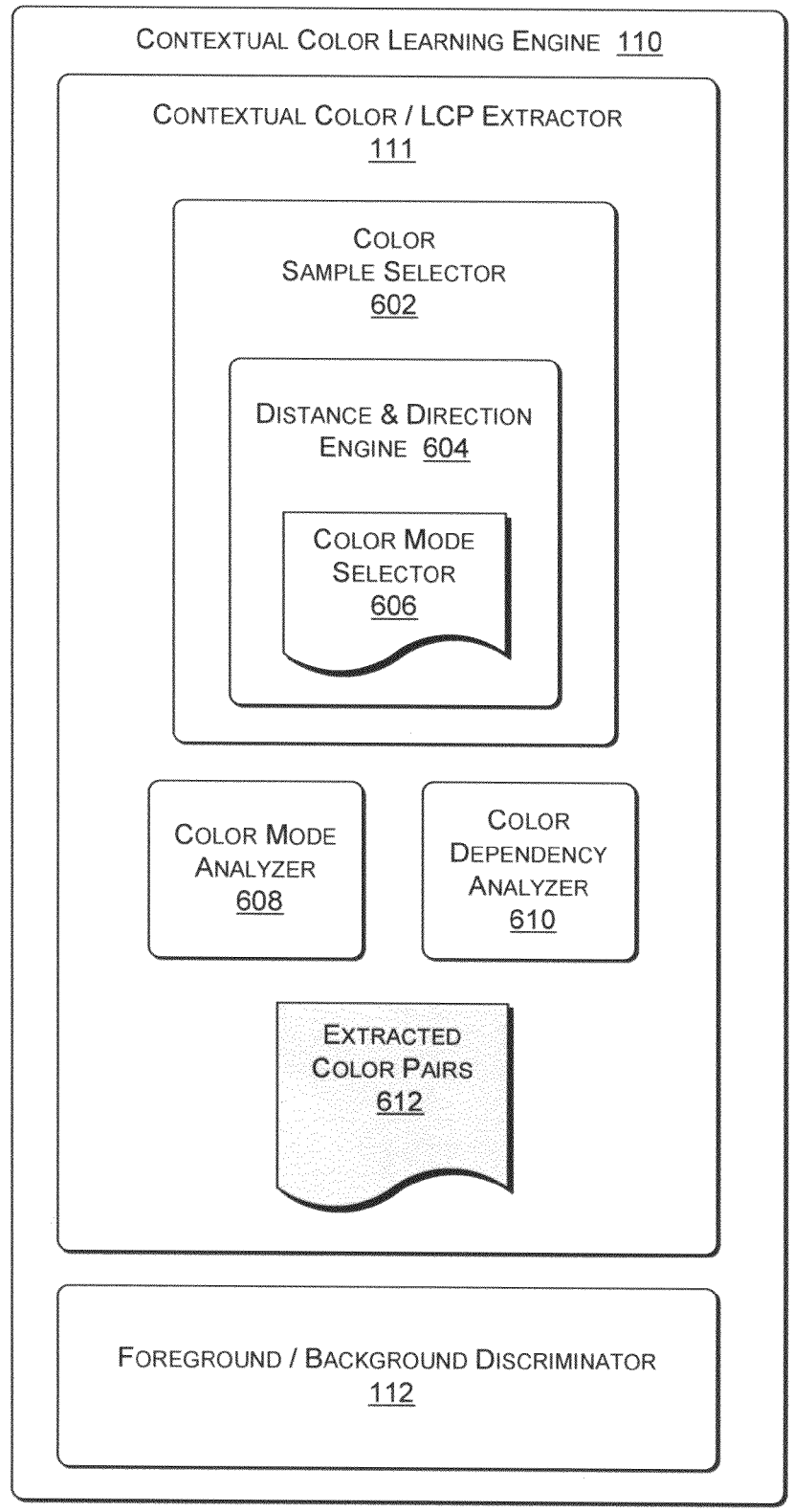
FIG. 6 is a block diagram of the exemplary contextual colors extractor of FIG. 3 in greater detail.

To achieve the Local Color Pattern-based appearance model 114, FIG. 6 shows one implementation of the contextual color learning engine 110 of FIG. 1, in greater detail. In this example configuration, the contextual color learning engine 110 includes the contextual color extractor 111, which further includes a color sample selector 602 to gather multiple color samples around a given block of an image, i.e., thereby detecting a local color pattern (LCP). The distance & direction engine 604 determines where to obtain these color samples, based on settings of a color mode selector 606. In a given image, foreground and background colors tend to be modal, that is, "color mode" with respect to differentiating foreground and background considers how many primary colors a foreground object or the background are composed of, and what the primary colors are. The color mode selector 606 can determine the sensitivity or threshold at which one color mode is distinguished from another. Then, the distance & direction engine 604 scans in each of multiple directions for a contextual color that falls in a different color mode from that of the subject block being landmarked, so that these contrasting nearby colors provide classification of the subject block based on the colors sampled when compared with known foreground and background color modes in the appearance model 114.

The contextual color learning engine 110 also includes a color mode analyzer 608, a color dependency analyzer 610, storage of extracted color pairs 612, and a foreground/background discriminator 112. These components will now be described in greater detail. It should be noted that the illustrated contextual color learning engine 110 is just one example arrangement of components. Other versions of the contextual color learning engine 110 may include different components in different arrangements.

The color mode analyzer 608 and the color dependency analyzer 610 are described first before detailed description of the energy terms. The concepts of color mode and color dependency play an important role in the description of contextual color and edge profile. "Color mode" with respect to differentiating foreground and background considers how many primary colors a foreground object or the background are composed of, and what the primary colors are. "Color dependency" describes the probability that one color occurs concurrently with another color. Thus, any color pair ($c_i$, $c_j$) 612 can be described by color mode and color dependency. Typically, the color mode analyzer 608 learns the color mode of foreground and background individually. The color dependency analyzer 610 learns the color dependency from each contextual color for the appearance model 114, or from each edge profile for the edge profile model 126. Both the color mode and the color dependency generally follow a Gaussian distribution and can easily be learned form a group of example colors with K-means or other GMM fitting methods.

Example Contextual Color Extraction

Figure 7:
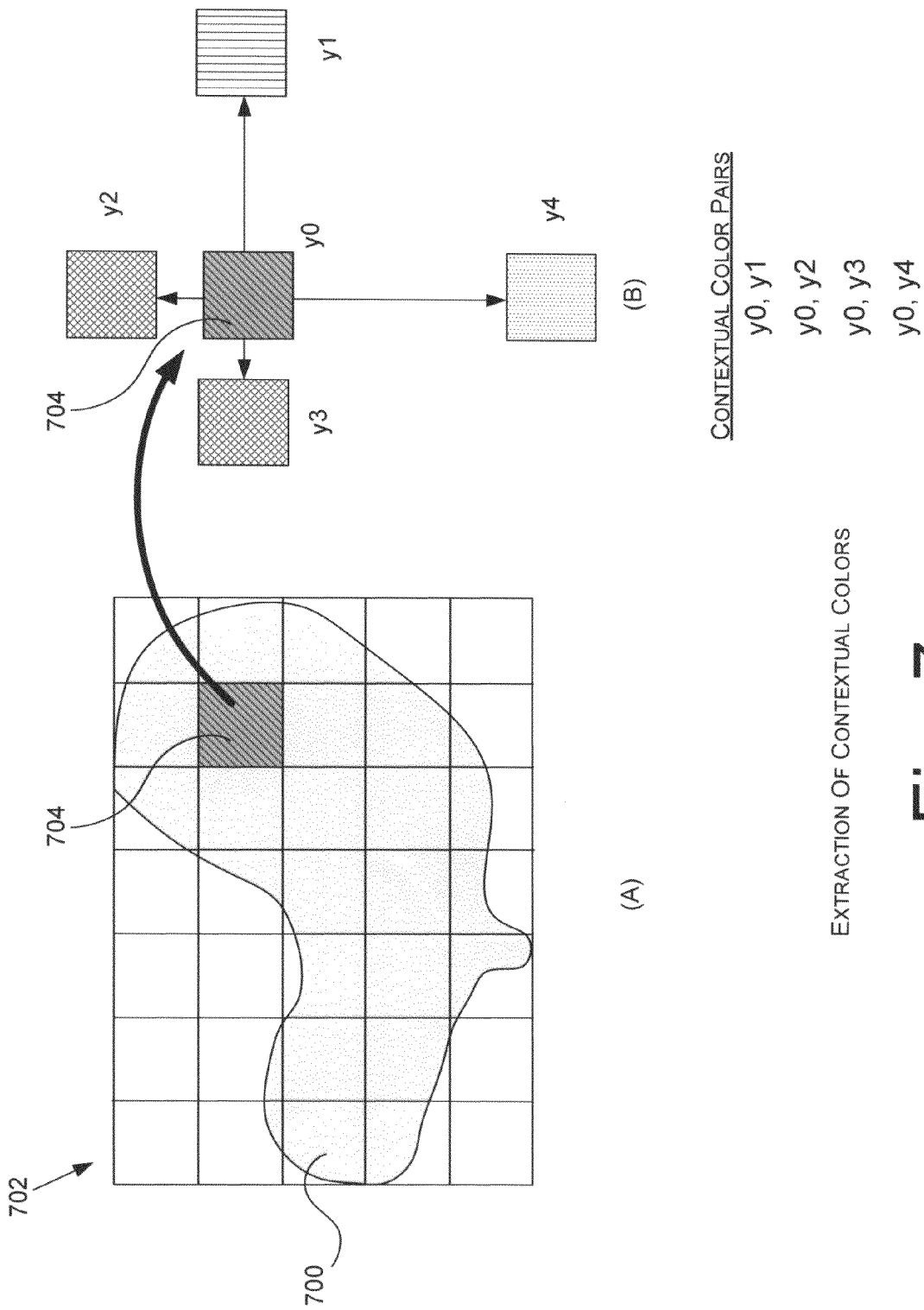
FIG. 7 is a diagram introducing exemplary extraction of contextual colors.

In one implementation, the contextual color is designed as follows. The Mean-shift pre-segmenter 314 partitions the image into segments. As shown in FIG. 7, for a given segment 700, the image partitioner 312 first finds a bounding rectangle 702. The block generator 316 divides the bounding rectangle 702 into blocks 704, but the blocks are not necessarily the same size). Then, in the contextual colors extractor 110, the color sample selector 602 (FIG. 6) seeks a contextual block along each of multiple predefined directions (an example of four predefined directions are shown in FIG. 7(b)). To ensure that the contextual block can provide reliable contextual information, the distance & direction engine 604 may impose a constraint that the contextual sample block is not too far away from the subject block 704 and that its mean color falls in a different mode from that of $B_{p,m}{}^v$. In this way, the contextual color features of the block 704 are defined, including mean color and mean color of the contextual block (the sample) along the n-th direction. For the image I with $N_s{}^v$ segments $S^v = \{S_p{}^v\}_{p=1}^{N_s{}^v}$, there are $\{y_{p_v}{}^v\}_{p=1}^{N_s{}^v}$ color contextual features, where $y_p{}^v = \{y_{p,m}{}^v\}_{m=1}^{N_p}$ is the feature of the segment $S_p{}^v$ 700.

Edge Profiles

Figure 8:
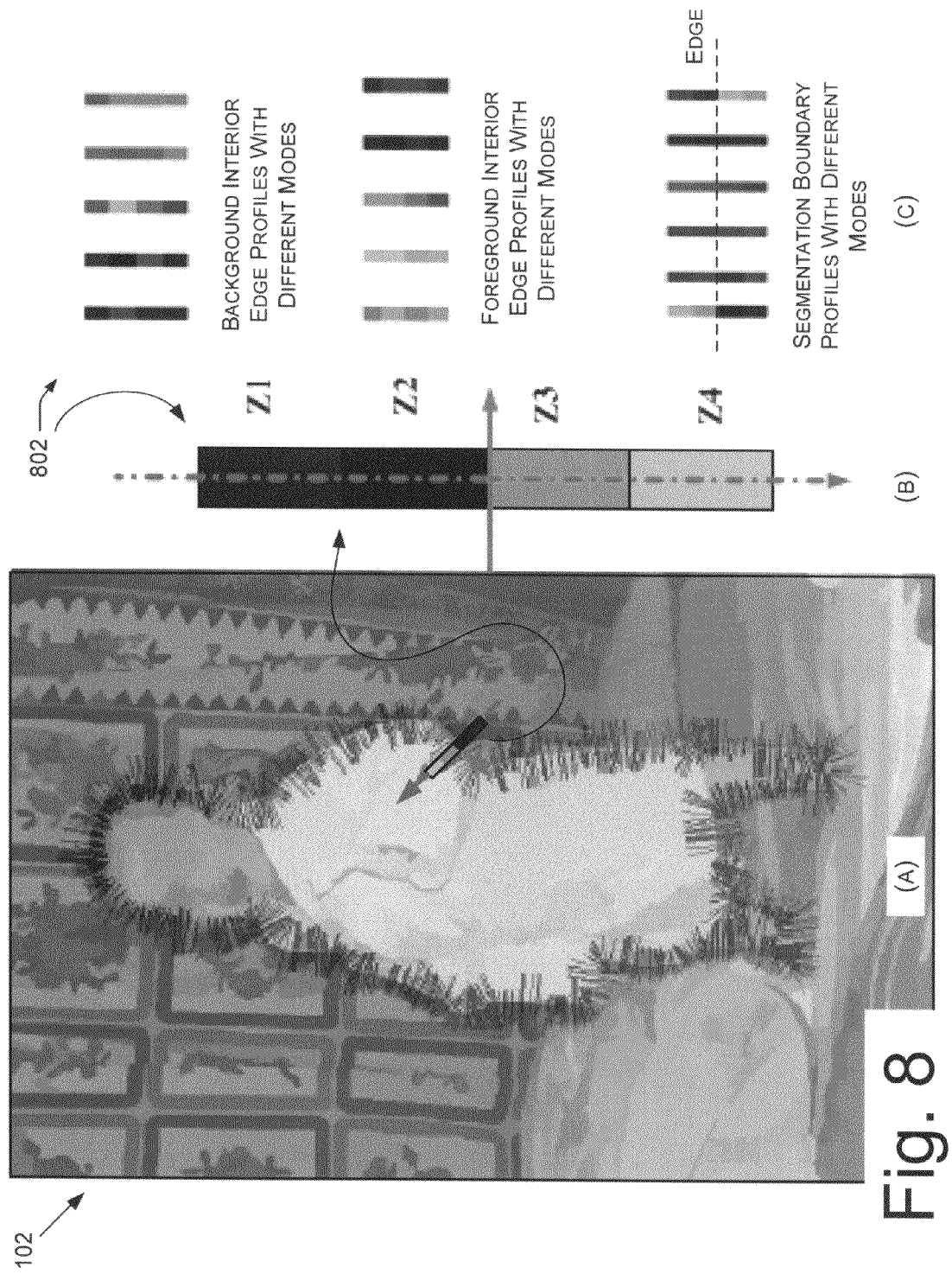
FIGS. 8-12 are available in color. Copies of this patent application with color drawings will be provided by the Patent Office upon request and payment of the necessary fee.

First, the segmentation attributes engine 100 builds models 424 for these three types of edges by leanings appearances—edge profiles 802—along the edges in the model image 102. FIG. 8 shows extraction of edge profiles 802 and typical cluster centers. FIG. 8(a) is a model image 102 from which numerous edge profiles 802 are extracted along its segmentation boundary. When extracted for a distance across an edge, such as the segmentation boundary as shown in FIG. 8(b), each edge profile 802 may include a part that is characteristic of the background (e.g., Z1 and Z2) and a part that is characteristic of the foreground (e.g., Z3 and Z4). FIG. 8(c) shows typical cluster centers of the three types of edges. The various parts (Z1, Z2, Z3, and Z4) of the edge profiles 802 from a model image 102 may also be color-averaged across multiple instances in order to create an averaged profile for each type of edge. Then, edges may be classified using Mixture Gaussian Model.

In one implementation, the edge profiler 122 extracts the edge information to describe the appearance along an edge, i.e., by extracting color strips that have sequences of colors across an edge to make each profile 802. For example, the edge profiler 122 can extract profiles along the normal direction of the common border and also its reverse direction, until the profiles traverse r regions in each direction as FIG. 8(a) shows. The features may be extracted as the mean colors of the segments they traverse.

Detailed Example Implementation

In one implementation, the visual object cutout engine 200 formulates the object cutout as a binary labeling problem, and solves it by minimizing Gibbs energy E(X) of a Markov Random Field (MRF) on a graph G=⟨v,ϵ⟩:

$$E(X) = \sum_{i \in v} E_1(y_i) + \lambda \sum_{(i,j) \in \varepsilon} E_2(y_i, y_j) \quad (1)$$

where v is the set of all pixels and ϵ is the set of all arcs connecting adjacent pixels. $y_i \in \{0,1\}$ is the label for each pixel $p_i \in V$, where $y_i=0$ means the pixel $p_i$ belongs to background, while $y_i=1$ means foreground. $E_1(y_i)$ is the likelihood energy denoting the cost when labeling pixel $p_i$ with $y_i$, and $E_2(y_i, y_j)$ is the smoothness energy providing a handicap when two adjacent pixels are given different labels. λ is a hyper-parameter to balance the two terms.

In this implementation, the Local Color Pattern (LCP)-based appearance model 114 is used to obtain the likelihood term, and an edge profile model 126 is learned in order to modulate the smoothness term. These two ingredients are demonstrated to be effective when used together and contribute complementarily to the final object cutout result.

Likelihood by the Local Color Pattern Model

Local Color Pattern Extraction

Figure 9:
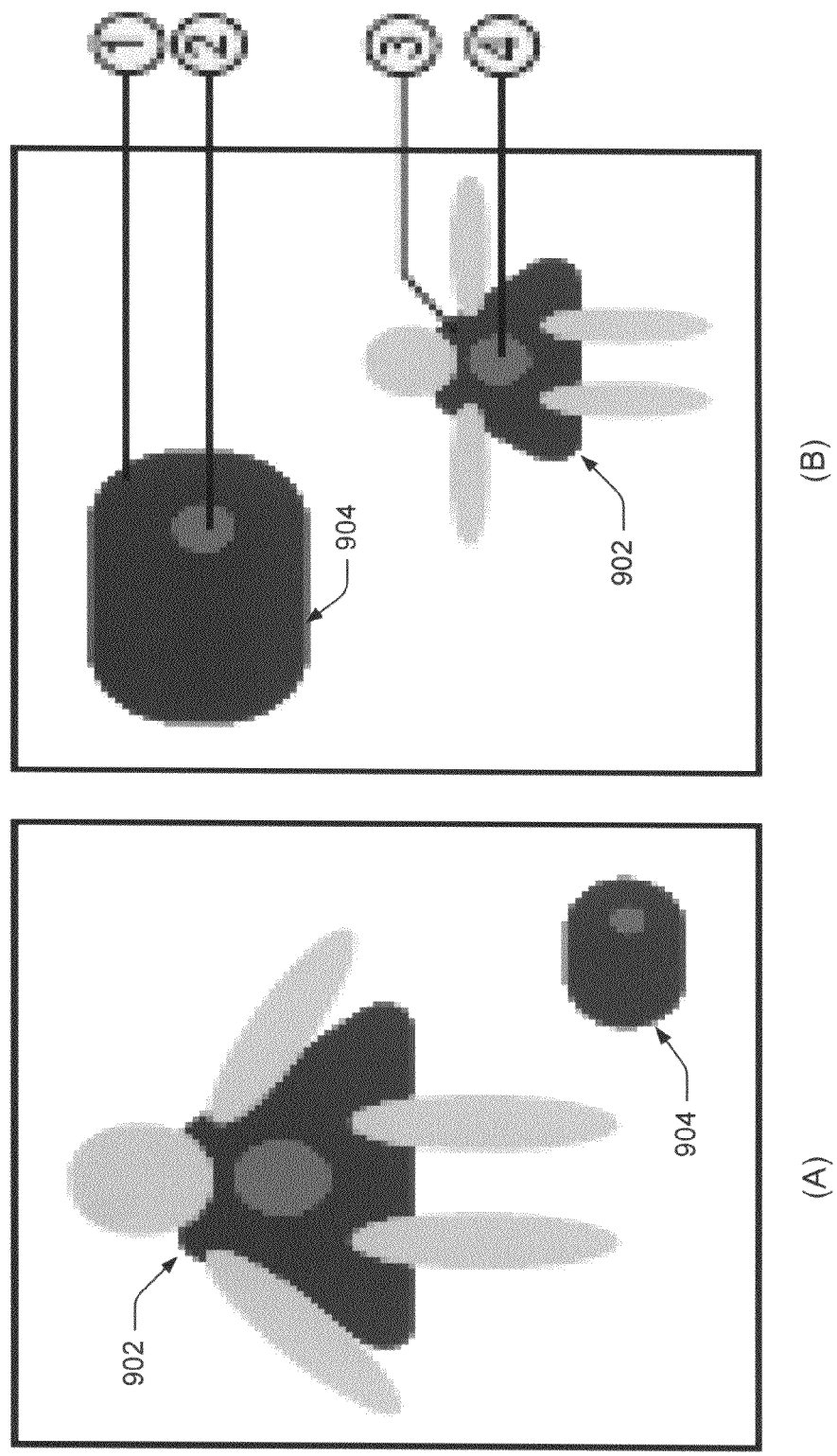

FIG. 9 shows exemplary differentiation of foreground object 902 and background object 904 based on reduction of color ambiguity and edge information. Although foreground 902 and background 904 may share similar color, the probability that they share similar color configuration is much lower, thus ambiguity is greatly reduced if this additional information is used. "Color configuration" means colors that are distributed in predefined directions around a certain subject color. For example, the two images 9(a) and 9(b) contain the same objects but with different positions and scales. The doll 902 in 9(a) is the foreground object 902, and the user wants to cut out the same doll 902 in 9(b). However, since region 1 and 3 are both in blue color, the task is ambiguous. By considering the color configuration, the objects can be easily discriminated since region 1 is surrounded mainly by white color; while region 3 has a great deal of yellow around it (head and limbs). This color configuration does not rely on the scale of the object. That is, although the doll 902 in FIG. 9(b) is much smaller than that in FIG. 9(a), the color configuration surrounding blue region 3 does not change.

For regions where even color configuration cannot distinguish between foreground and background, i.e., regions 2 and 4, that have similar color configuration (surrounded by blue of regions 1 and 3), edge information can help. It is learned from the example image 9(a) that a blue-red-paired edge only appears inside objects, so an exemplary technique can confidently attenuate the edges around regions 2 and 4 in 9(b), thereby avoid a segmentation cut along these edges.

Figure 10:
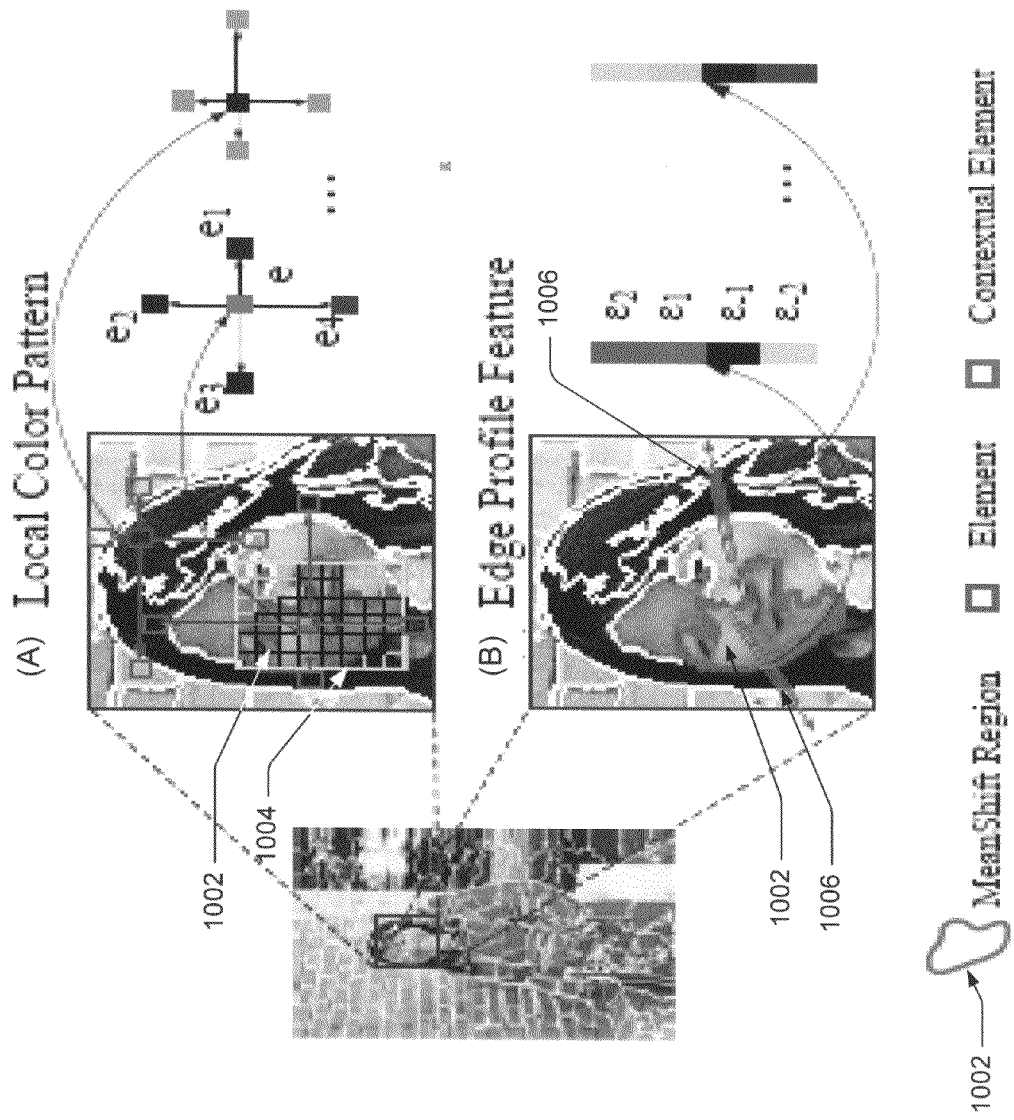

Thus, Local Color Pattern (LCP) can be defined as a color configuration, which reflects the spatial distribution of distinctive colors, e.g., skin color of the face surrounded by black color of the hair as in FIG. 10.

In this case, color configuration is not the contextual color, which is defined along a specific spatial distance from a current block of the image. Also, the configuration is different from colors of neighboring regions obtained by oversegmentation methods such as MeanShift: in the case of oversegmentation, one color-homogeneous region can be divided into many pieces (such as the face of the girl in FIG. 10), and the neighboring pieces in the same homogeneous region cannot provide configuration information for each other; on the contrary, increasing the color radius parameter may cause undersegmentation by merging regions with different colors together, which is also undesirable.

One important issue in the LCP extraction is to tell which colors are "distinctive". To avoid the hard threshold of using color difference, the contextual color/LCP extractor 111 carries out Gaussian Mixture Model (GMM) clustering on pixel colors to get an overview about how many color modes are in the image and what they are, i.e., red, blue, black, etc. The color space of all the pixels C is divided into several non-overlapping color modes: $C = \bigcup_n C_n$. This division gives a general and robust view of what colors in the image are close (in the same mode) or different (in different modes).

The presegmenter 314 oversegments the image with Mean-Shift. Considering the large variation of the shape and the size of MeanShift regions, the image partitioner 312 divides each region R into elements, then extracts the LCP feature based on the estimated color modes and elements. The example in FIG. 10(*a*) illustrates the extraction process.

For the MeanShift region with red boundary (partial face of the girl) 1002, its bounding box (yellow rectangle) 1004 is divided into a grid. When the grid is overlayed on the region, the region is divided into elements. Most of the elements are rectangles, except those along the boundary of the region. For regions that are smaller than a grid, the whole region is taken as an element. This method avoids color blending along the region boundary and maintains a small region with distinctive color compared with the method of directly cutting the image into a regular grid.

For each element e, the contextual color extractor 111 searches along D predefined directions for contextual elements, denoted by $e_1, \ldots, e_D$. A contextual element is defined as the nearest element that belongs to different color mode from that which e belongs to, thus the search can reach beyond the MeanShift region boundary 1002, and get to the real distinctive color to form a color pattern. For instance, in FIG. 10(*a*), D=4, contextual elements $e_1, \ldots, e_4$ are obtained for element e. The searching for $e_1$ reaches beyond the region boundary, and gets to the region of hair, which is the true contextual color to form the "color pattern."

Finally, with each element e and its contextual elements $e_1, \ldots, e_D$, the contextual color extractor 111 forms local color pattern p for element e as: $p(e) = [c_0, c_1, \ldots c_D]^T$, where $c_1, \ldots c_D$ are mean colors of contextual elements $e_1, \ldots, e_D$, and $c_0$ is the mean color of element e.

Inferring the Likelihood Energy

Modeling the Local Color Pattern

For an example image, the contextual color learning engine 110 obtains LCP features for all foreground and background elements, and uses GMM as described above to fit foreground LCP likelihood model $l_F(p) = p(p|y_e=1)$ and background LCP likelihood model $l_B(p) = p(p|y_e=0)$. Here, $y_e$ denotes the label of element e. Taking a non-informative prior on foreground and background, a posterior is obtained proportional to likelihood by a same constant, i.e., $p_{F,B}(p) \propto l_{F,B}(p)$.

Under an assumption that colors of contextual elements $c_i$, i=1, ..., D are conditionally independent of each other on condition that the center color $c_0$ is given, approximations are made to give a more practical solution to fit the high dimensional model l (p) by decomposing it into many lower dimensional models:

$$l(p) = p(c_0, c_1, \ldots, c_n) \approx p(c_0) \prod_{i=1}^{D} p(c_i | c_0) \quad (2)$$

Optionally, the fitting can be further cut down according to the color modes obtained:

$$l(p) = \sum_j \left[ p(c_0 \in C_j) \prod_{i=1}^{D} p(c_i | c_0 \in C_j) \right] \quad (3)$$

Inferring Likelihood Energy for the Related Images

For a related (novel) image 104, the corresponding segmentation attributes engine 100' extracts a Local Color Pattern for each element, and calculates $p_{F,B}(p)$ from $l_{F,B}(p)$ with Equation (3).

When calculating the probability of pixel $p_i$ belonging to foreground/background, it is assumed that all pixels in a MeanShift region 1002 have the same value. As a result, in one implementation the contextual color learning engine 110 carries out a voting process inside each region R, and takes the median among the probabilities of elements to be the value of the pixels inside this region to increase robustness:

$$p_{F,B} \atop \forall_{p_i \in R}(p_i) = p_{F,B}(R) \leftarrow \mathop{meadian}_{\forall_{p \in R}} [p_{F,B}(p)] \quad (4)$$

Likelihood energy is finally obtained by normalization:

$$E_1(y_i = 1) = \frac{\log[p_F(p_i)]}{\log[p_F(p_i)] + \log[p_B(p_i)]} \quad (5)$$

$$E_1(y_i = 0) = \frac{\log[p_B(p_i)]}{\log[p_F(p_i)] + \log[p_B(p_i)]}$$

Figure 11:
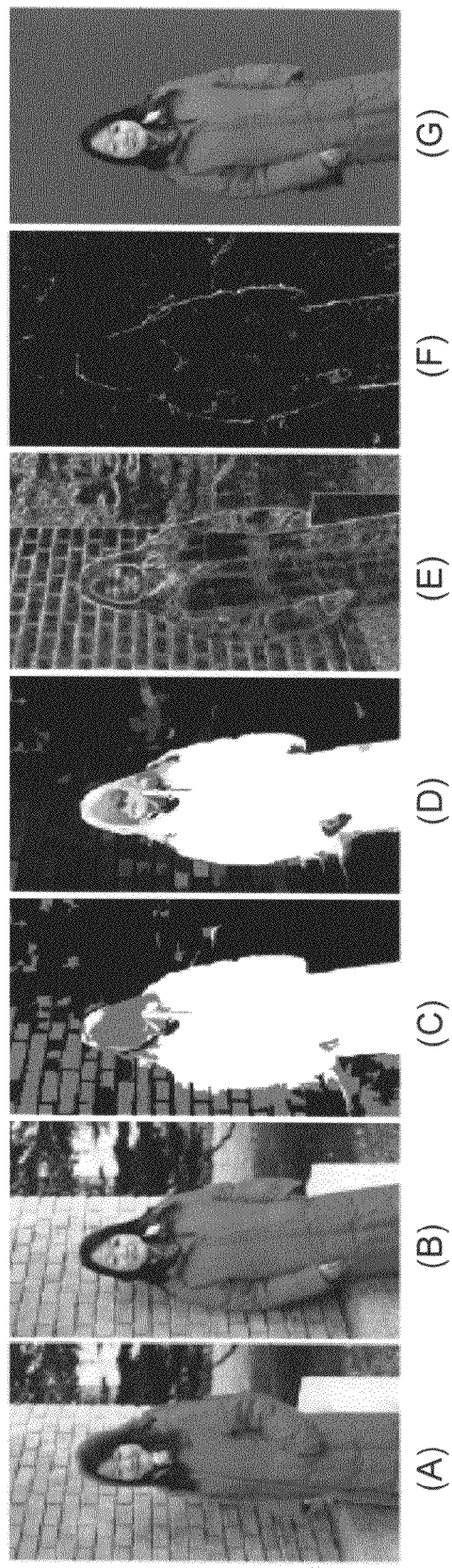

FIG. 11(*d*) shows an exemplary probability map of from the visual object cutout engine 200. Ambiguity in regions with similar color (face and wall) is reduced compared with FIG. 11(*c*), which uses the color of pixels as the feature.

Contrast Modulation by Edge Profile Model

The smoothness term used in conventional graph cut based segmentation methods is based on image contrast, that is, as in Equation (6):

$$E_2(y_i, y_j) = |y_i - y_j| \exp(-\beta d_{ij}) \quad (6)$$

where β is a parameter to weight the color distance $d_{ij}$. Here, $d_{ij} = \|I_i - I_j\|$, and $\beta = [2 \langle d_{ij} \rangle]^{-1}$ with $\langle \rangle$ as the expectation operator. $I_i$ and $I_j$ are colors of $p_i$ and $p_j$.

This term forces the segmentation to follow the strong edges. However, when there exists strong Interior Edges inside the foreground or background, undesirable segmentation will occur. Conventional techniques that use a conventional smoothness term will fail by cutting along this interior edge.

Next, edge profile feature extraction will be described providing a remedy for the above-introduced problem of undesirable segmentation along strong interior edges. In one implementation, this problem is solved by modulating $d_{ij}$ based on a rotation invariant edge profile feature. The modulation reduces $d_{ij}$ at interior edges and increases $d_{ij}$ at boundary edges between foreground and background (i.e., the segmentation boundary), thereby guiding the cutout to more likely follow the boundary edge.

Edge Profile Feature Extraction

The edge learning engine 120 regards shared borders of MeanShift regions 1002 as edge segments, and extracts profiles along them to describe color appearance in the normal (perpendicular) direction of the edge. Pixel pairs inside MeanShift regions 1002 are directly treated as interior edges, since object boundaries are less likely to occur in such a region 1002.

For example, in FIG. 10(*b*), starting from a pixel pair on the edge between two adjacent regions, N distinctive colors are found in a normal direction of the edge (green arrows) 1006 towards the two regions, respectively. Totally, 2N colors are collected to form the profile feature: $\epsilon = [\epsilon_{-N}, \ldots, \epsilon_{-1}, \epsilon_1, \ldots, \epsilon_N]^T$. In FIG. 10, N=2.

Modulating the Smoothness Energy

Similar to the exemplary techniques used for inferring the likelihood energy described above, the likelihood models for the boundary edge 412 and interior edges 408 and 410 are fitted as follows in Equation (7):

$$l(\varepsilon) = p(\varepsilon_1)p(\varepsilon_{-1} \mid \varepsilon_1) \prod_{i=1}^{N-1} p(\varepsilon_{i+1} \mid \varepsilon_i) \prod_{i=1}^{N-1} p(\varepsilon_{-i-1} \mid \varepsilon_{-i}) \quad (7)$$

either for $l_B(\epsilon)$ (Boundary Edge) or $l_I(\epsilon)$ (Interior Edge).

This simplification is based on the approximation that only adjacent colors in edge profiles are dependent. The edge feature is extracted in two directions in a symmetric manner, thus the first two terms in the equation can be equivalently changed to $p(\epsilon_{-1})p(\epsilon_1 \mid \epsilon_{-1})$.

In the related image 104, for any adjacent pixel pair $(p_i, p_j)$ at an edge between regions $R_1$ and $R_2$, $p_B(\epsilon)$ and $p_I(\epsilon)$ can be obtained by $p_{I,B}(\epsilon) \propto l_{I,B}(\epsilon)$.

The final posterior of the pixel pairs $(p_i, p_j)$ at the shared borders of regions $R_1$ and $R_2$ are obtained through a robust voting over all pairs at the sharing border between $R_1$ and $R_2$:, as in Equation (8):

$$p_{I,B}(p_i, p_j) = p_{I,B}(\varepsilon) \leftarrow \underset{\substack{\forall \varepsilon = (p_i, p_j) \\ p_i \in R_1, p_j \in R_2}}{\text{median}} [p_{I,B}(\varepsilon)] \quad (8)$$

The edge modulator 328 uses $p_I(p_i, p_j)$ and $p_B(p_i, p_j)$ to modulate the contrast, as in Equation (9). When $p_I(p_i, p_j)$ is large enough, the edge between $p_i$ and $p_j$ is very likely to be an interior edge, and the edge modulator 328 reduces $d_{ij}$. When $p_B(p_i, p_j)$ is large enough, there is confidence that the edge is a boundary edge, and the edge modulator 328 enhances $d_{ij}$. When there is no confidence either way, the areas are kept unchanged:

$$d_{ij} = \begin{cases} \|I_i - I_j\| \left(\frac{p_B(p_i, p_j)}{p_I(p_i, p_j)}\right)^\lambda, & \left|\log \frac{p_B(p_i, p_j)}{p_I(p_i, p_j)}\right| > \delta, \\ \|I_i - I_j\|, & \text{otherwise} \end{cases} \quad (9)$$

In Equation (9), $\lambda > 0$ controls the intensity of modulation, and $\delta > 0$ is a confidence threshold for robustness.

FIG. 11(*f*) shows an exemplary contrast map 330. After modulation of contrast, edges inside foreground and background are generally attenuated, while edges along foreground/background boundaries are enhanced compared with the original contrast map, e.g., in FIG. 11(*e*).

Mechanism Analysis

The Local Color Pattern model and edge modulation provide complementary information for the task of object cutout. The LCP model 114 is designed to reduce ambiguity caused by similar appearance between foreground object and background; while the edge profile model 126 assists cutout by modulating smoothness energy. Each model affects a different aspect of the segmentation task, and combining them together provides complementary reinforcement.

Figure 12:
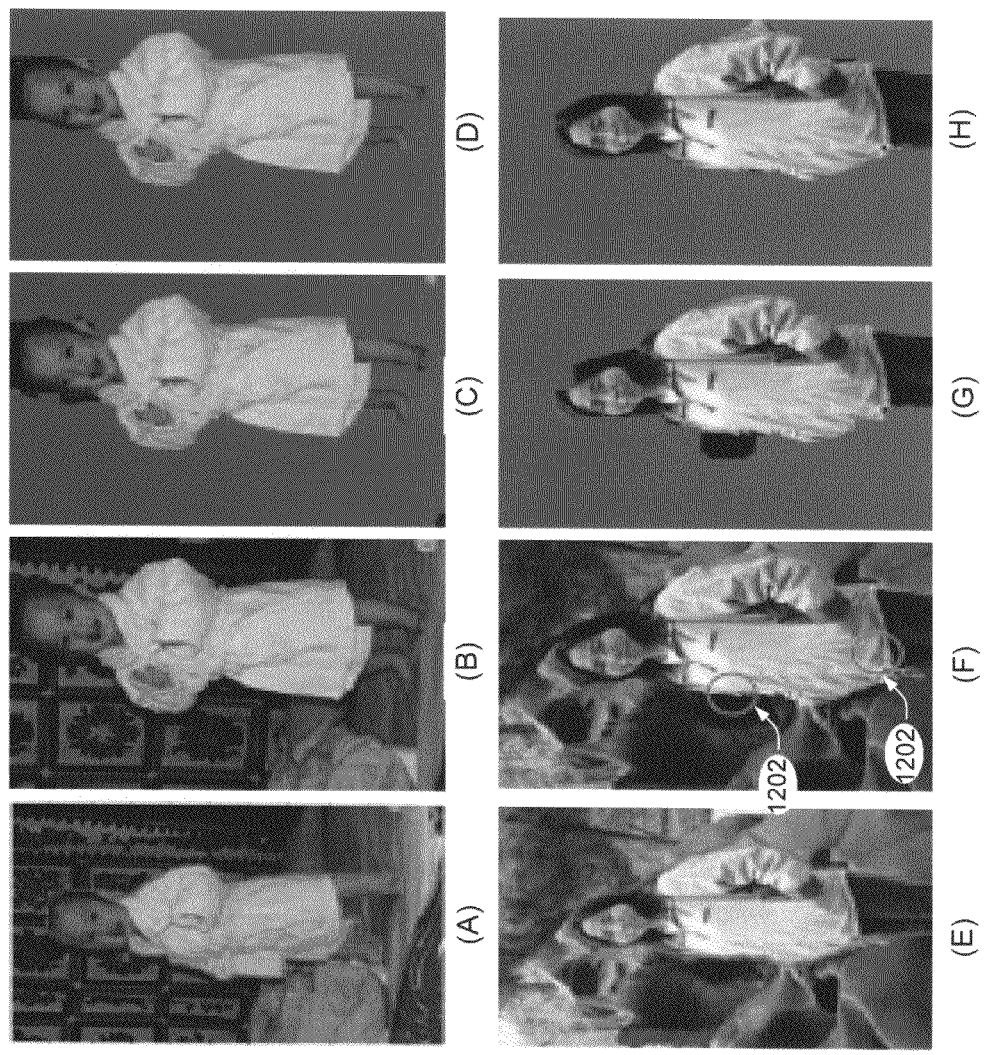

FIG. 12 demonstrates this complementary relationship between Local Color Pattern Model 114 and the edge profile model 126. On one hand, using only the Local Color Pattern model 114 to cut out 12(*b*) according to 12(*a*), regions (such as eye and hand) with similar context are misclassified, as shown in 12(*c*). With the help of edge information, it becomes evident that these parts are inside the foreground, thus the hole is filled up, as in 12(*d*). On the other hand, there are black-white patterns (marked by circles) 1202 on both boundary edge and interior edge in 12(*f*), and the edge model 126 cannot discriminate them. With both the edge profile model 126 and a single color feature, a result such as 12(*g*) is obtained, while using the edge profile model 126 and the LCP model 114 provides 12(*h*), which eliminates ambiguity.

Exemplary Methods

Figure 13:
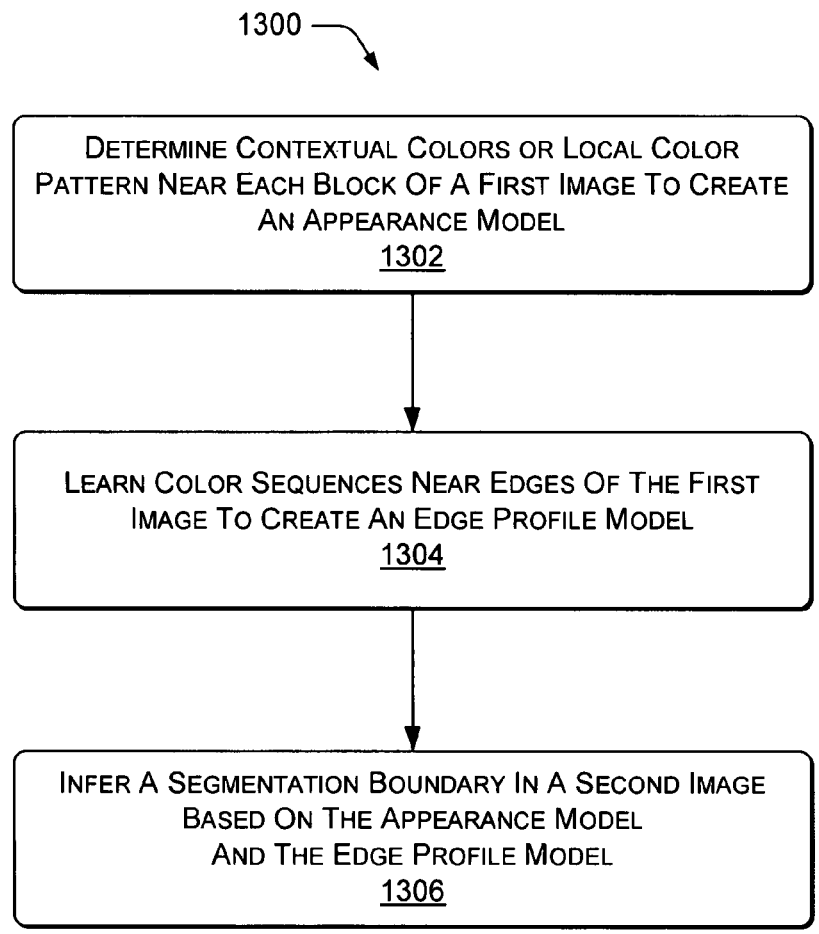
FIG. 13 is a flow diagram of an exemplary method of inferring a segmentation boundary in a second image based on contextual colors and edge profiles of a first image.

FIG. 13 shows an exemplary method 1300 of inferring a segmentation boundary in a second image based on contextual colors and edge profiles of a first image. In the flow diagram, the operations are summarized in individual blocks. The exemplary method 1300 may be performed by hardware, software, or combinations of hardware, software, firmware, etc., for example, by components of the visual object cutout engine 200.

At block 1302, contextual colors are determined near each block of a first image to create an appearance model. The contextual colors identify each block within an exemplary appearance model. Since foreground and background almost never possess identical color fabric—even though sometimes similar in general overall color—these contextual color patterns provide a much stronger mechanism for differentiating foreground from background than the conventional technique of differentiating foreground from background just on their single general color.

On the more atomic level of image blocks, the exemplary extraction of contextual colors becomes an even stronger technique for differentiating foreground blocks from background blocks than conventional techniques. Conventional techniques compare the properties of the blocks themselves, such as color, intensity, etc. But when foreground and background are somewhat similar in color, the properties of the blocks themselves result in an ambiguous differentiation. In the exemplary extraction of contextual colors described herein, the color patterns formed between a given block and contrasting nearby colors—e.g., as available through color pairs extracted and associated with each block—provide much more information with which to differentiate a foreground block from a background block.

It is highly unlikely that a foreground or background block is oriented within the same constellation of contextual colors, as the foreground segment and the background segment tend to possess their own respective color palettes. Hence, the contextual colors associated with a given block become a fingerprint providing accurate identification as either foreground or background.

It should be noted that the contextual colors for a given block of image are not necessarily those colors immediately adjacent to the block. In fact, the exemplary method 1300 may traverse a distance in each direction from the block to find a contrasting color to provide context.

At block 1304, color sequences near visual edges of the first image are learned in order to create an edge profile model. In one implementation, the exemplary method 1300 scans a known segmentation boundary of a model image at numerous points, proceeding inside the foreground object and outside into the background during a scan of the colors on either side of the edge. For example, the method 1300 may take a linear scan at right angles to the segmentation edge. These edge scans provide profiles of the colors and more particularly, the sequences of colors that are characteristically near, inside, and/or outside the segmentation boundary. This information is compiled into an edge profile model. This model provides a powerful tool for recognizing in other images, what is truly the segmentation boundary, and what is merely a visual edge within the foreground object or within the background.

At block 1306, a segmentation boundary is inferred in a second image based on the appearance model and the edge profile model. There are many ways the appearance model and edge profile model may be used to infer an accurate segmentation boundary in a test image 104 to which the segmentation attributes of the appearance model and the edge profile model are being propagated. In one implementation, the data energies of the model foreground and the likely foreground segment of the unknown test image are compared and the data energy minimized to optimize the segmentation boundary. A total energy that includes the data energy associated with the appearance model and a smoothness energy associated with the edge profile model can be minimized to provide the segmentation boundary optimization. The edge profile model of the model image can be used to modulate the smoothness energy component, which translates into weakening the impact of interior edges and strengthening the impact of the segmentation boundary edge.

Figure 14:
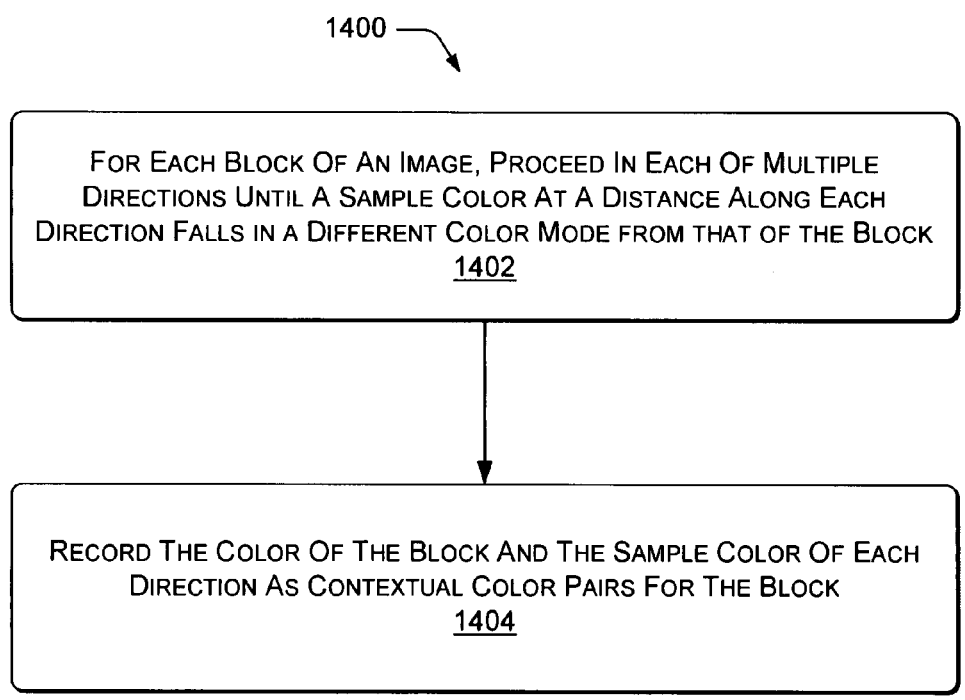
FIG. 14 is a flow diagram of an exemplary method of extracting contextual colors.

FIG. 14 shows an exemplary method 1400 of extracting contextual colors. In the flow diagram, the operations are summarized in individual blocks. The exemplary method 1400 may be performed by hardware, software, or combinations of hardware, software, firmware, etc., for example, by components of the visual object cutout engine 200.

At block 1402, for each block of an image, respective distances in each of multiple directions from a given block are scanned—for example, traversed by a scanning color detection technique—until a sample color at a distance along each direction is found, such that the sample color falls in a different color mode from that of the subject block.

At block 1404, the color of the block and the sample color obtained for each direction are recorded as contextual color pairs for the block. If four directions are selected to provide contextual color information for each block, then four color pairs become associated with each block of the image.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-implemented method, comprising:
   under control of one or more computing systems comprising one or more processors,
   receiving a first image and a second image;
   creating an appearance model of a first foreground object and a first background of the first image based on contextual color patterns of the first image;
   creating an appearance likelihood model of a likely foreground and a likely background of the second image, the appearance likelihood model including a cumulative likelihood energy of the likely foreground;
   creating an edge profile model of the first image based on learned color contexts near edges in the first image;
   creating an edge profile likelihood model of the second image based on additional learned color contexts of edges in the second image, the edge profile likelihood model including a likely segmentation boundary; and
   segmenting the second image into a second foreground object and a second background by optimizing the likely segmentation boundary in the second image through minimizing energy related to the appearance model and the appearance likelihood model, and minimizing a likelihood energy component and a smoothness energy component that is associated with the edge profile model and the edge profile likelihood model using a min-cut/max-flow technique.

2. The computer-implemented method as recited in claim 1, wherein the first image is segmented into the first foreground object and the first background.

3. The computer-implemented method as recited in claim 1, wherein the optimizing improves an appearance likelihood and an edge profile likelihood of the second image based at least in part on the appearance model and the edge profile model obtained from the first image.

4. The computer-implemented method as recited in claim 3, wherein the creating the appearance model includes representing a likelihood energy of the first foreground object in the first image that is used in optimizing the likely segmentation boundary of the second image.

5. The computer-implemented method as recited in claim 3, wherein the creating the edge profile model of the first image includes creating edge profiles for modulating a smoothness energy used in optimizing the likely segmentation boundary of the second image.

6. The computer-implemented method as recited in claim 1, wherein optimizing the segmentation boundary includes optimizing a binary labeling process by minimizing a total energy via the min-cut/max-flow technique, the total energy including the likelihood energy component and the smoothness energy component,
   wherein at least part of the appearance model represents the likelihood energy component, and
   wherein at least part of the edge profile model modulates the smoothness energy component.

7. The computer-implemented method as recited in claim 6, wherein the min-cut/max-flow technique comprises $$E(X) = \sum_{p \in V} E_{data}(x_p) + \alpha \sum_{(p,q) \in \varepsilon} E_{smooth}(x_p, x_q),$$

wherein $E_{data}x_p$ comprises the likelihood energy component, encoding a cost when the label of a pixel p in the first image is $x_p$, and $E_{smooth}(x_p, x_q)$ comprises the smoothness energy component, denoting an additional cost when labels of adjacent pixels p and q in the first image are labeled $x_p$ and $x_q$, respectively, and α comprises a parameter to balance between the likelihood energy component and the smoothness energy component.

8. The computer-implemented method as recited in claim 1, wherein creating the appearance model based on contextual color patterns in the first image includes:
  partitioning the first image into segments;
  partitioning each segment into blocks;
  selecting multiple directions in the first image to proceed from each block;
  for each block:
    proceeding in each of the directions in the first image until a sample color along the direction differs by a contrast threshold from a color of the block; and
    recording the sample color and the color of the block as a contextual color pair.

9. The computer-implemented method as recited in claim 8, further comprising recording a number of the contextual color pairs for each block, the number equal to the number of the directions selected.

10. The computer-implemented method as recited in claim 8, wherein at least one of the segments represents the first foreground object.

11. The computer-implemented method as recited in claim 8, further comprising pre-segmenting the first image via a mean-shift technique.

12. The computer-implemented method as recited in claim 1, wherein a likelihood energy of the appearance model or the cumulative likelihood energy of the appearance likelihood model are calculated via contextual color pairs, the contextual color pairs for the first and second images being obtained by:
  partitioning the first image or the second image into segments;
  partitioning each segment into blocks;
  selecting multiple directions in the first image or the second image to proceed from each block;
  for each block:
    proceeding in each of the directions in the first image or the second image until a sample color along the direction differs by a contrast threshold from a color of the block;
    recording the sample color and the color of the block as a contextual color pair; and
    recording a number of the contextual color pairs for each block, the number equal to the number of the directions selected.

13. The computer-implemented method as recited in claim 1, further comprising applying the segmenting to one of: automatically segmenting images similar to the first image; automatically segmenting images that have a different foreground or a different background than the first image; automatically cutting out a video object moving between frames of a video sequence; automatically detecting a facial view; automatically searching a database during content-based image retrieval.

14. A computer-implemented method of propagating object cutout from a model image, comprising:
  under control of one or more computing systems comprising one or more processors,
    dividing the model image into blocks;
    sampling contextual colors around each of the blocks that fall into a different color mode than a color mode of each of the blocks along at least two perpendicular directions in the model image to create an appearance model that includes local color patterns of the model image;
    creating an appearance likelihood model of a likely foreground and a likely background of an additional image, the appearance likelihood model including a cumulative likelihood energy of the likely foreground;
    creating an edge profile model of the model image based on learned color contexts near edges in the model image;
    creating an edge profile likelihood model of the additional image based on additional learned color contexts of edges in the additional image, the edge profile likelihood model including a likely segmentation boundary; and
    segmenting the additional image into a foreground object and a background by optimizing the likely segmentation boundary in the additional image through minimizing energy related to the appearance model and the appearance likelihood model, and minimizing a likelihood energy component and a smoothness energy component that is associated with the edge profile model and the edge profile likelihood model using a min-cut/max-flow technique.

15. The computer-implemented method as recited in claim 14, wherein sampling contextual colors around each block further includes:
  selecting multiple directions to proceed from each block, the multiple directions including the at least two perpendicular directions;
  for each block:
    proceeding in each of the directions until a sample color of a different color mode is detected;
    recording the sample color and the color of the block as a contextual color pair; and
    recording a number of the contextual color pairs for each block, the number equal to the number of the directions selected.

16. The computer-implemented method as recited in claim 14, wherein the minimizing the likelihood energy component and the smoothness energy component optimizes binary labeling of each pixel in the additional image, and wherein the likelihood energy component denotes a cost when labeling each the pixel as either the foreground object or the background and the smoothness energy component is modulated to handicap two adjacent pixels that are given different labels to cause the segmentation boundary to follow a true object boundary.

17. The computer-implemented method as recited in claim 14, wherein the segmenting includes segmenting a particular image that has a different foreground or a different background than the model image, cutting out a video object moving between frames of a video sequence, or detecting a facial view in a specific image.

18. A system, comprising:
  means for sampling a local color pattern around each block of a first image to create an appearance likelihood model of a first foreground object and a first background of the first image;
  means for creating an appearance likelihood model of a likely foreground and a likely background of a second image, the appearance likelihood model including a cumulative likelihood energy of the likely foreground;
  means for learning edges in the first image to create an edge profile model;
  means for creating an edge profile likelihood model of the second image based on additional learned color contexts of edges in the second image, the edge profile likelihood model including a likely segmentation boundary; and
  means for segmenting the second image that is different from the first image into a second foreground object and a second background by optimizing the likely segmentation boundary in the second image through minimizing energy related to the appearance model and the appearance likelihood model, and minimizing a likelihood energy component and a smoothness energy component that is associated with the edge profile model and the edge profile likelihood model using a min-cut/max-flow technique.

19. The system as recited in claim 18, wherein the energy related to the appearance model and the appearance likelihood model comprises:
   a likelihood energy derived from the local color patterns of the first image and local color patterns extracted from the second image; and
   a smoothness energy of edges of the second image modulated by learned edges of the first image.

20. The computer-implemented method as recited in claim 1, wherein the edge profile model further includes likely foreground interior edges and likely background interior edges.

* * * * *